UNITED STATES PATENT OFFICE.

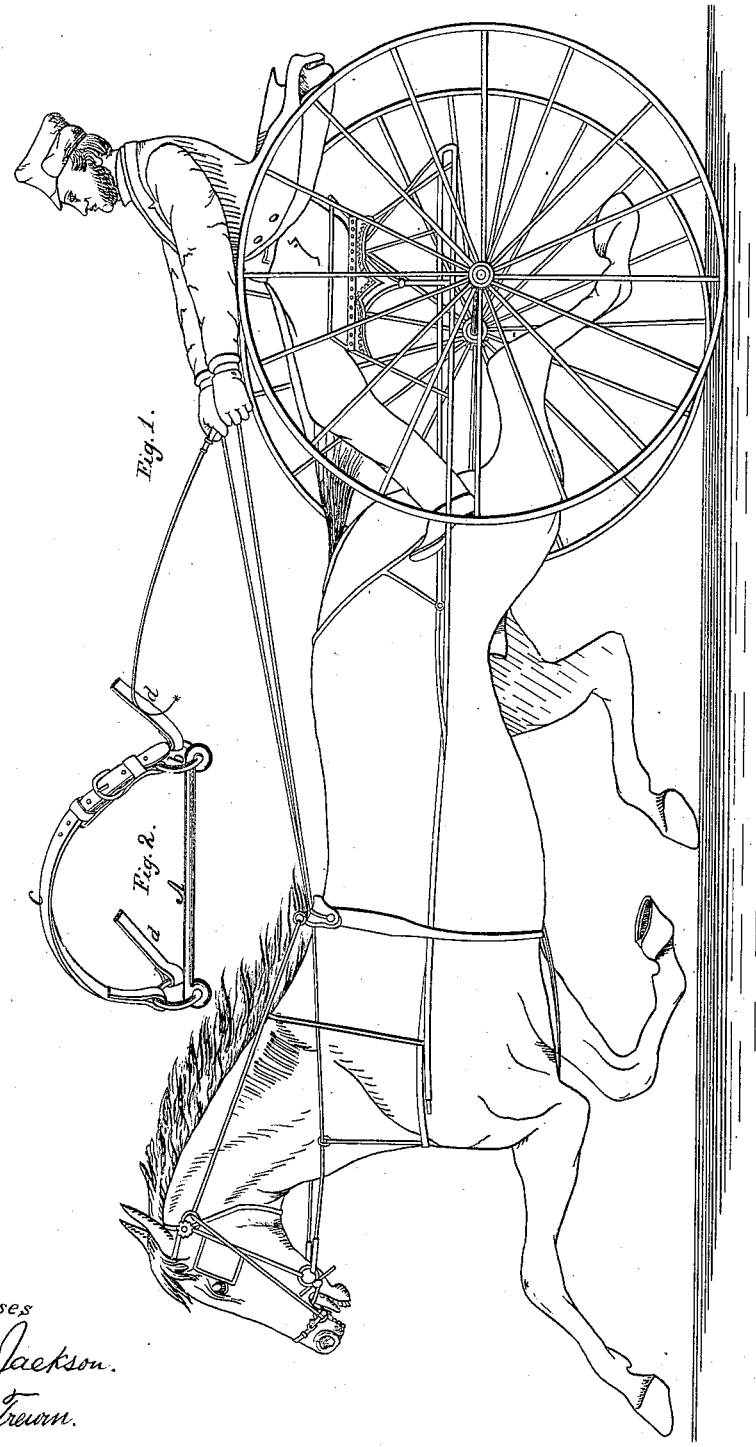

F. B. CARLETON, OF JEFFERSONVILLE, VERMONT.

IMPROVEMENT IN UPPER-JAW BITS.

Specification forming part of Letters Patent No. 59,178, dated October 30, 1866.

*To all whom it may concern:*

Be it known that I, F. B. CARLETON, of Jeffersonville, in the county of Lamoille and State of Vermont, have invented a new and Improved Upper-Jaw Bit for Horses; and I do hereby declare that the following is a full, clear, and exact description thereof, which will enable those skilled in the art to make and use the same, reference being had to the accompanying drawings, forming part of this specification, in which—

Figure 1 represents a side elevation of this invention when applied to a horse. Fig. 2 is a perspective view of the same detached.

Similar letters of reference indicate corresponding parts.

This invention consists in a bit applied to the upper jaw of a horse somewhat in front of the ordinary bit, in such a manner that the horse is effectually prevented from putting his head down, and an easy and effective curb is obtained.

A represents my additional bit, which is secured to the upper jaw of the horse, somewhat in front of the ordinary bit, as clearly shown in Fig. 1 of the drawings. Said bit is provided with two eyes, $a$, which are made to receive rings $b$, and a strap, $c$, fastened to these rings, serves to secure the bit in the desired position. From the rings $b$ extends the check-strap $d$, as clearly shown in Fig. 1.

If the horse makes an attempt to lower his head, the check-strap is strained and the head is raised; whereas with the ordinary bit the check-strap produces a downward rather than an upward strain, and the effect of the curb is partially counteracted. This bit also prevents a horse from kicking, since in kicking a horse always lowers his head.

What I claim as new, and desire to secure by Letters Patent, is—

The arrangement, with an ordinary bridle and bit, of the supplementary bit, which is strapped to the upper jaw of the horse forward of the ordinary bit, substantially as described.

F. B. CARLETON.

Witnesses:
WM. F. MCNAMARA,
W. HAUFF.